(12) United States Patent
Kumar et al.

(10) Patent No.: US 11,100,385 B2
(45) Date of Patent: Aug. 24, 2021

(54) SCALABLE FREE-RUNNING NEUROMORPHIC COMPUTER

(71) Applicant: Intel Corporation, Santa Clara, CA (US)

(72) Inventors: Raghavan Kumar, Hillsboro, OR (US); Gregory K. Chen, Hillsboro, OR (US); Huseyin E. Sumbul, Portland, OR (US); Ram K. Krishnamurthy, Portland, OR (US); Phil Knag, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1198 days.

(21) Appl. No.: 15/395,758

(22) Filed: Dec. 30, 2016

(65) Prior Publication Data

US 2018/0189632 A1 Jul. 5, 2018

(51) Int. Cl.
| | | |
|---|---|---|
| *G06N 3/04* | (2006.01) | |
| *G06N 3/063* | (2006.01) | |
| *G06N 3/08* | (2006.01) | |
| *G06F 7/58* | (2006.01) | |

(52) U.S. Cl.
CPC .............. *G06N 3/04* (2013.01); *G06F 7/582* (2013.01); *G06N 3/049* (2013.01); *G06N 3/063* (2013.01); *G06N 3/08* (2013.01)

(58) Field of Classification Search
CPC ........... G06N 3/0454; H04L 29/06095; H04L 29/06102; H04L 29/08072; H04L 29/08675

USPC .......................................................... 706/28
See application file for complete search history.

(56) References Cited

U.S. PATENT DOCUMENTS

| | | | | |
|---|---|---|---|---|
| 2013/0073491 | A1* | 3/2013 | Izhikevich | G06N 3/049 706/15 |
| 2015/0039546 | A1* | 2/2015 | Alvarez-Icaza | G06N 3/0472 706/27 |
| 2015/0286924 | A1* | 10/2015 | Arthur | G06N 3/08 706/25 |

FOREIGN PATENT DOCUMENTS

EP 0475732 A2 3/1992

OTHER PUBLICATIONS

Communication pursuant to Article 94(3) EPC, EP. App. No. 17207531.9, dated Oct. 16, 2019, 7 pages.

(Continued)

*Primary Examiner* — Viker A Lamardo
(74) *Attorney, Agent, or Firm* — Nicholson De Vos Webster & Elliott LLP

(57) ABSTRACT

Apparatus and method for a scalable, free running neuromorphic processor. For example, one embodiment of a neuromorphic processing apparatus comprises: a plurality of neurons; an interconnection network to communicatively couple at least a subset of the plurality of neurons; a spike controller to stochastically generate a trigger signal, the trigger signal to cause a selected neuron to perform a thresholding operation to determine whether to issue a spike signal.

27 Claims, 12 Drawing Sheets

(56) References Cited

OTHER PUBLICATIONS

European Search Report, EP. App. No. 17207531.9, dated May 17, 2018, 8 pages.
Summons to Attend Oral Proceedings, EP App. No. 17207531.9, Apr. 3, 2020, 7 pages.
Decision to Grant, EP App. No. 17207531.9, dated Mar. 25, 2021, 2 pages.
Communication under Rule 71(3) EPC, EP App. No. 17207531.9, dated Nov. 23, 2020, 7 pages.

* cited by examiner

US 11,100,385 B2

SCALABLE FREE-RUNNING NEUROMORPHIC COMPUTER

BACKGROUND

Large-scale neuromorphic computers are often built by hierarchically tiling modular small-scale neuromorphic cores in a Network on Chip (NoC). In such designs, a source neuron in a neuromorphic core might send spike signals to a target neuron located in some other core on the network. Existing neuromorphic computers perform spike integration by storing all the incoming fan-in spikes in buffers that are often deep enough to address axonal delays, also known as spike buffers. This approach is highly inefficient in terms of area and power due to the enormous number of spike buffers needed in neuromorphic computer designs with large fan-in/fan-out connections. Spike buffers based integration approach does not allow spikes to be integrated as they arrive in a neuromorphic core like in biological neural networks. Also, global synchronization signals are needed to update the timesteps of neurons across the neuromorphic computer, which adds significant routing and power overheads.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of an apparatus and method are described for a scalable, free-running neuromorphic processor. In the following description, numerous specific details are set forth to provide a thorough understanding of the embodiments of the invention. One skilled in the relevant art will recognize, however, that the invention can be practiced without one or more of the specific details, or with other methods, components, materials, structures, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Exemplary Processor Architectures and Data Types

Figure 1:
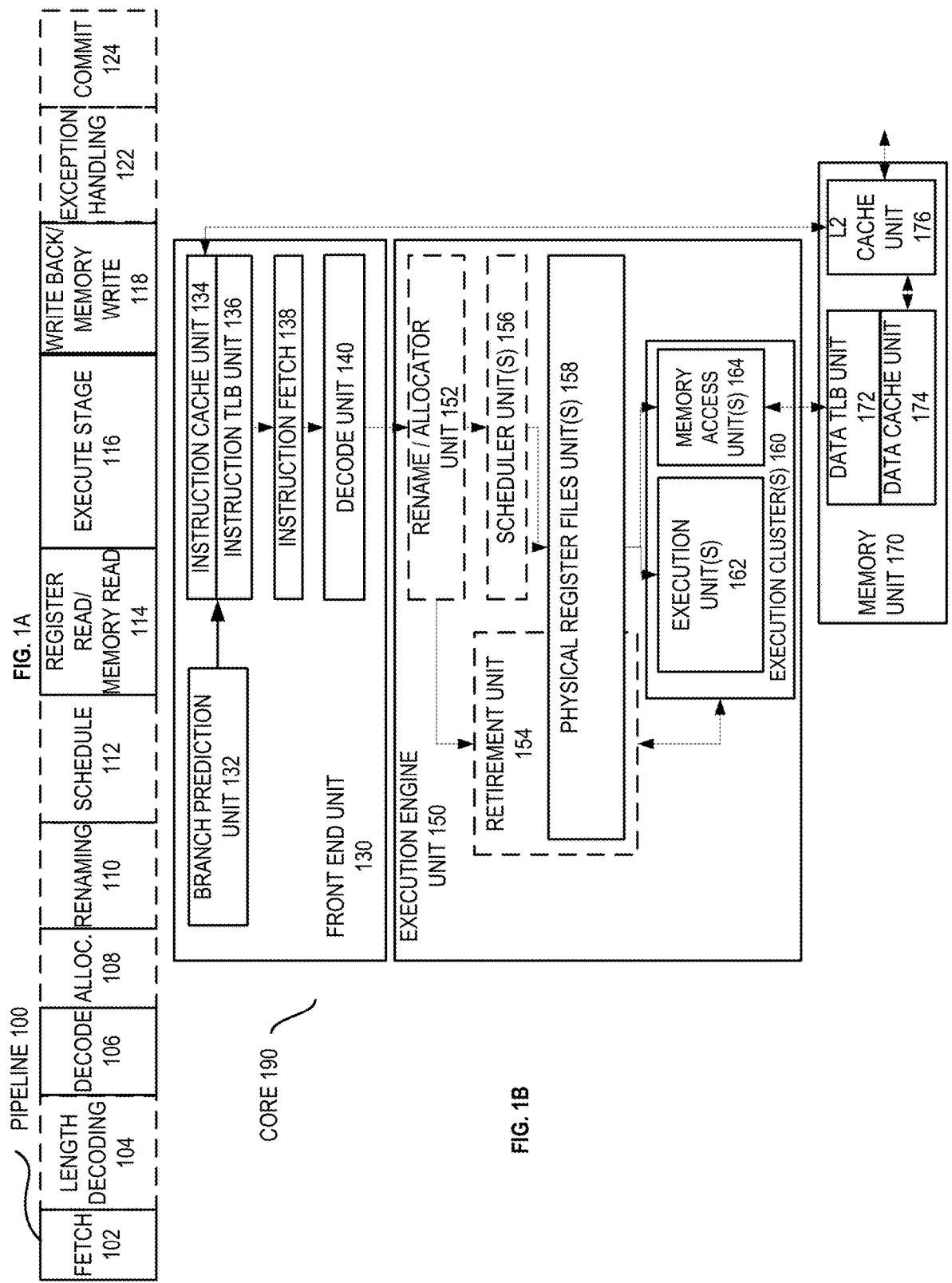
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB)

136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
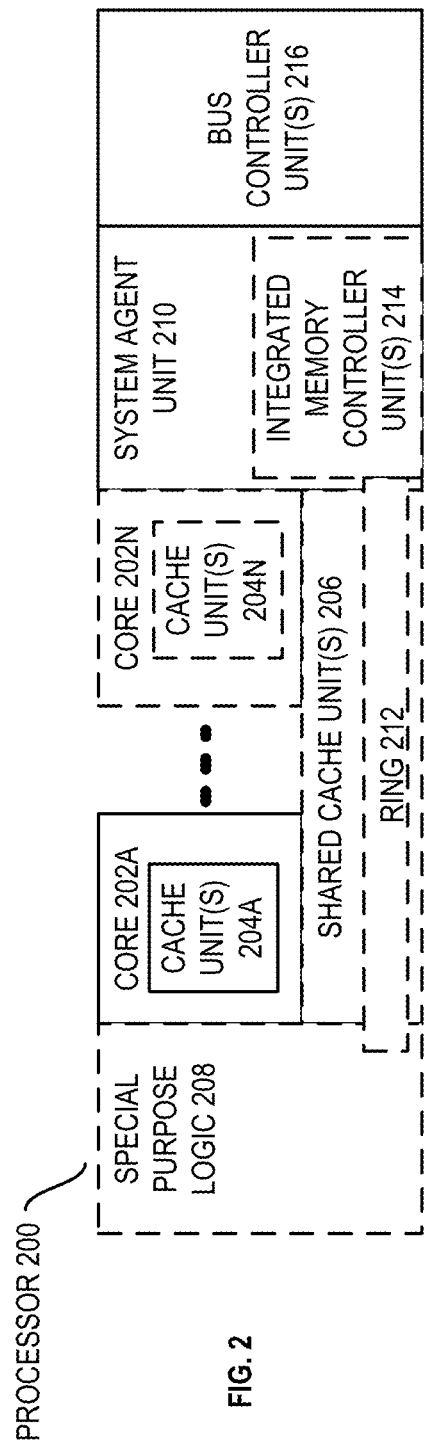
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
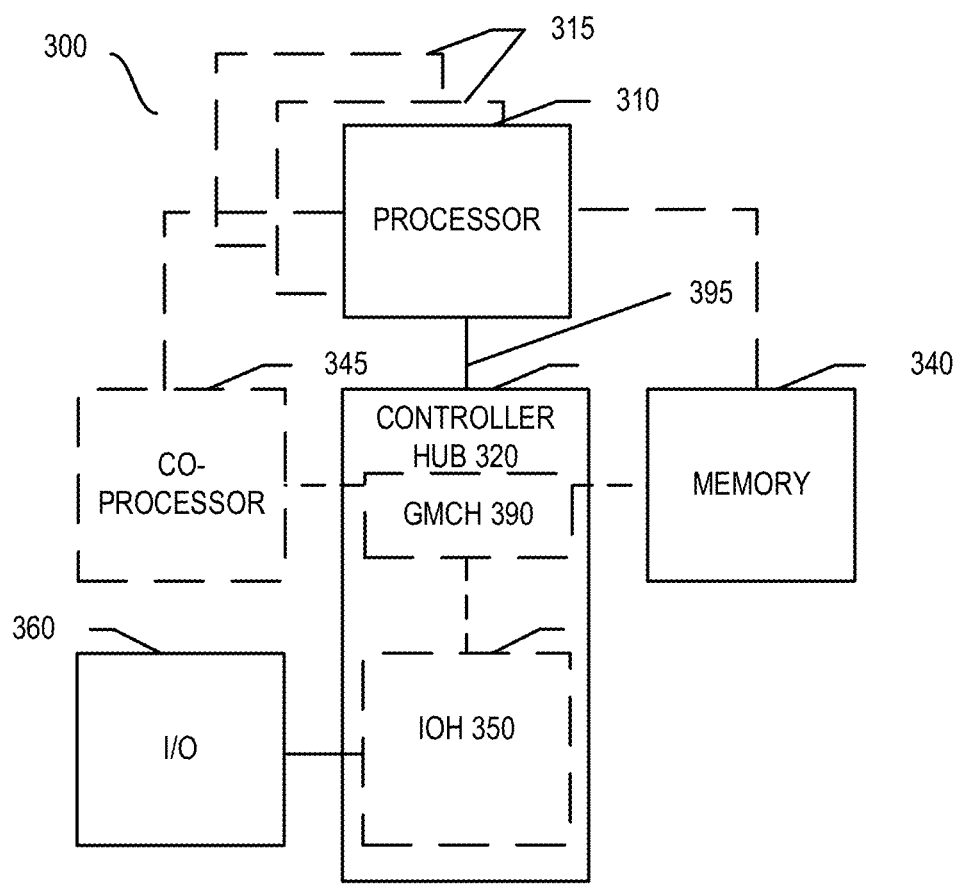
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
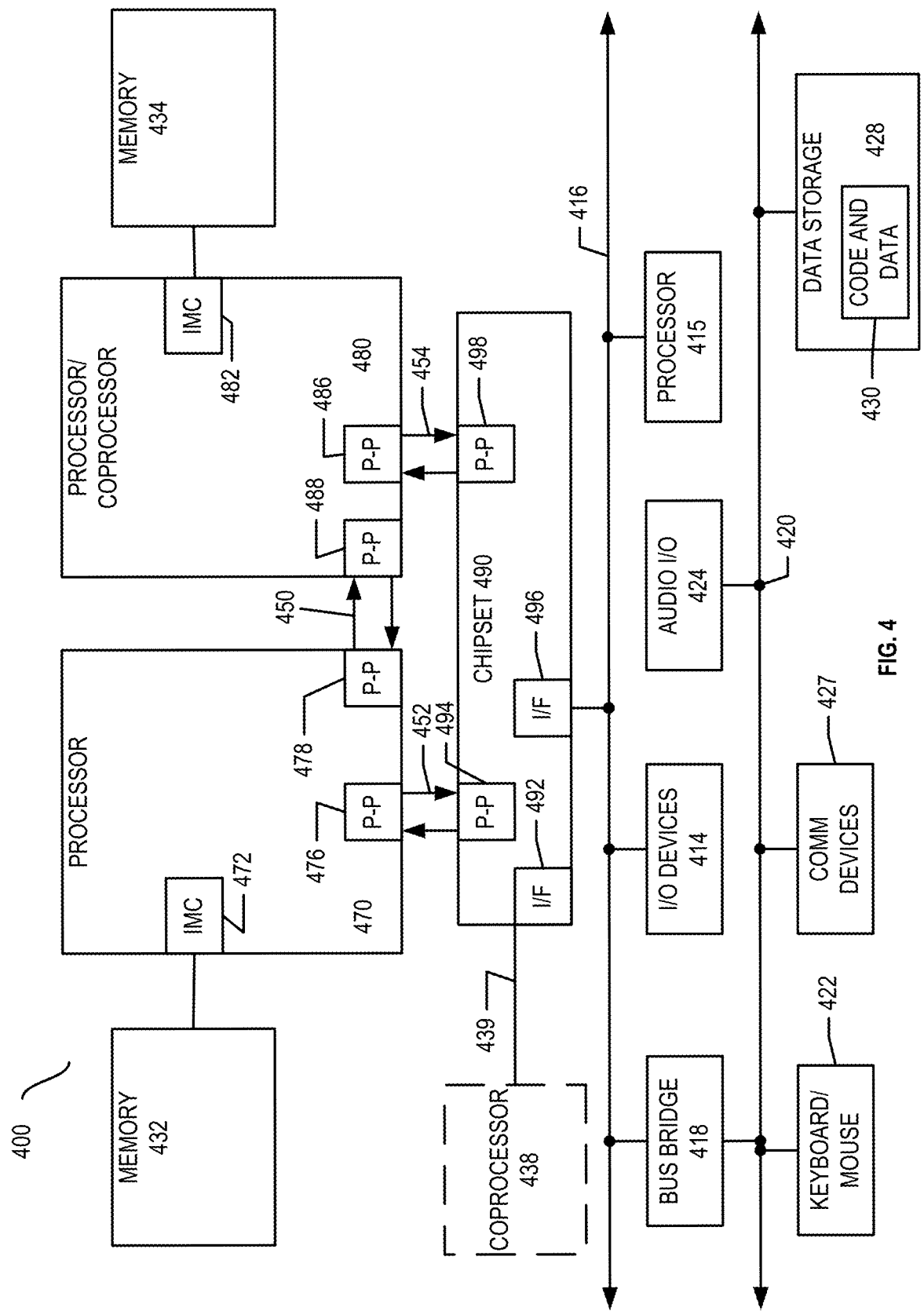
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively.

Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
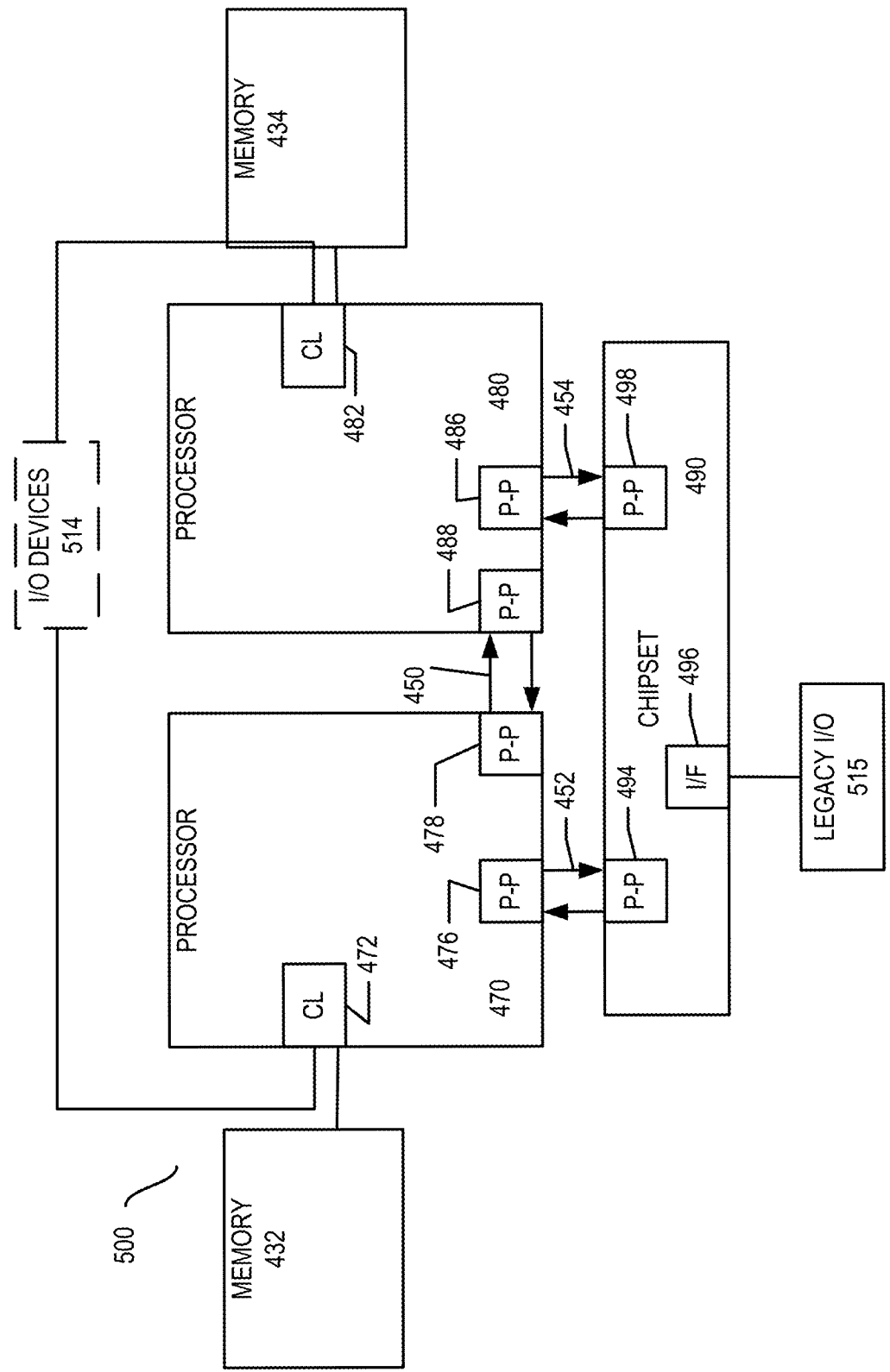
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
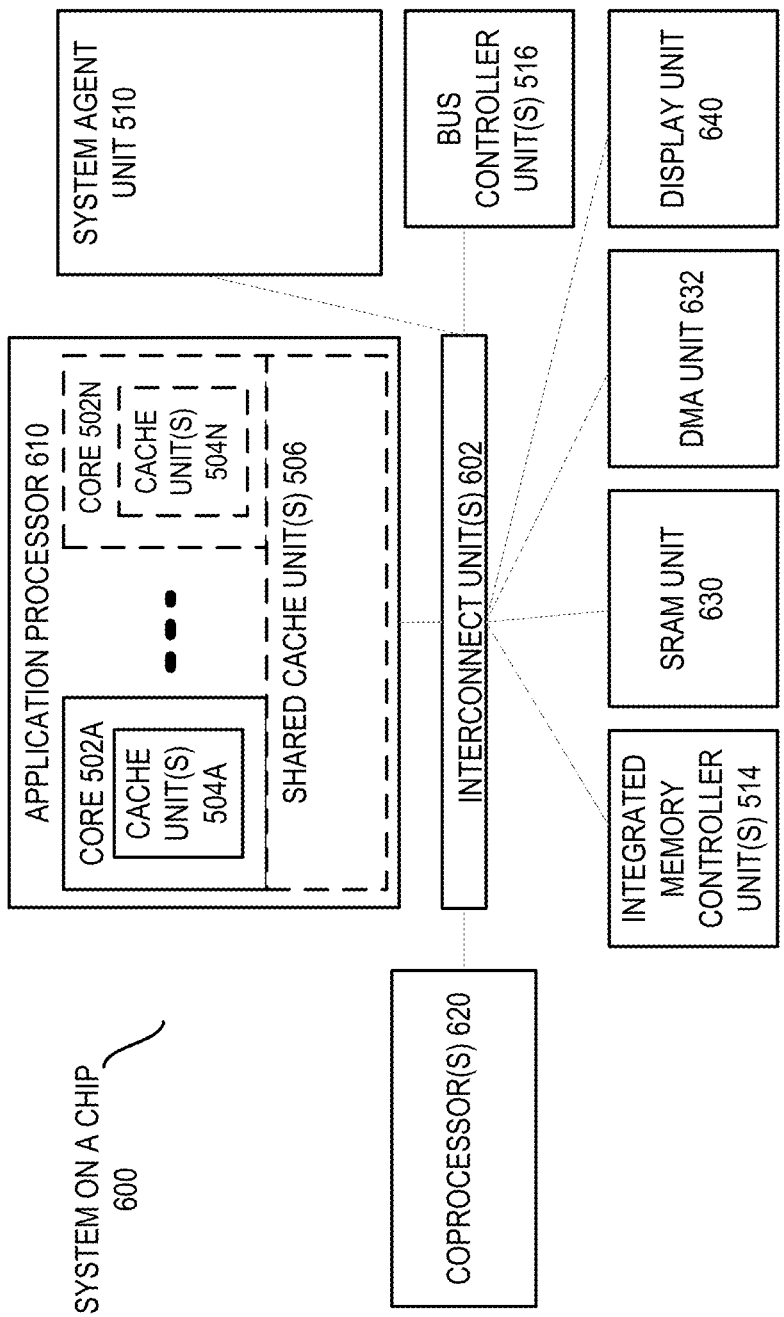
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
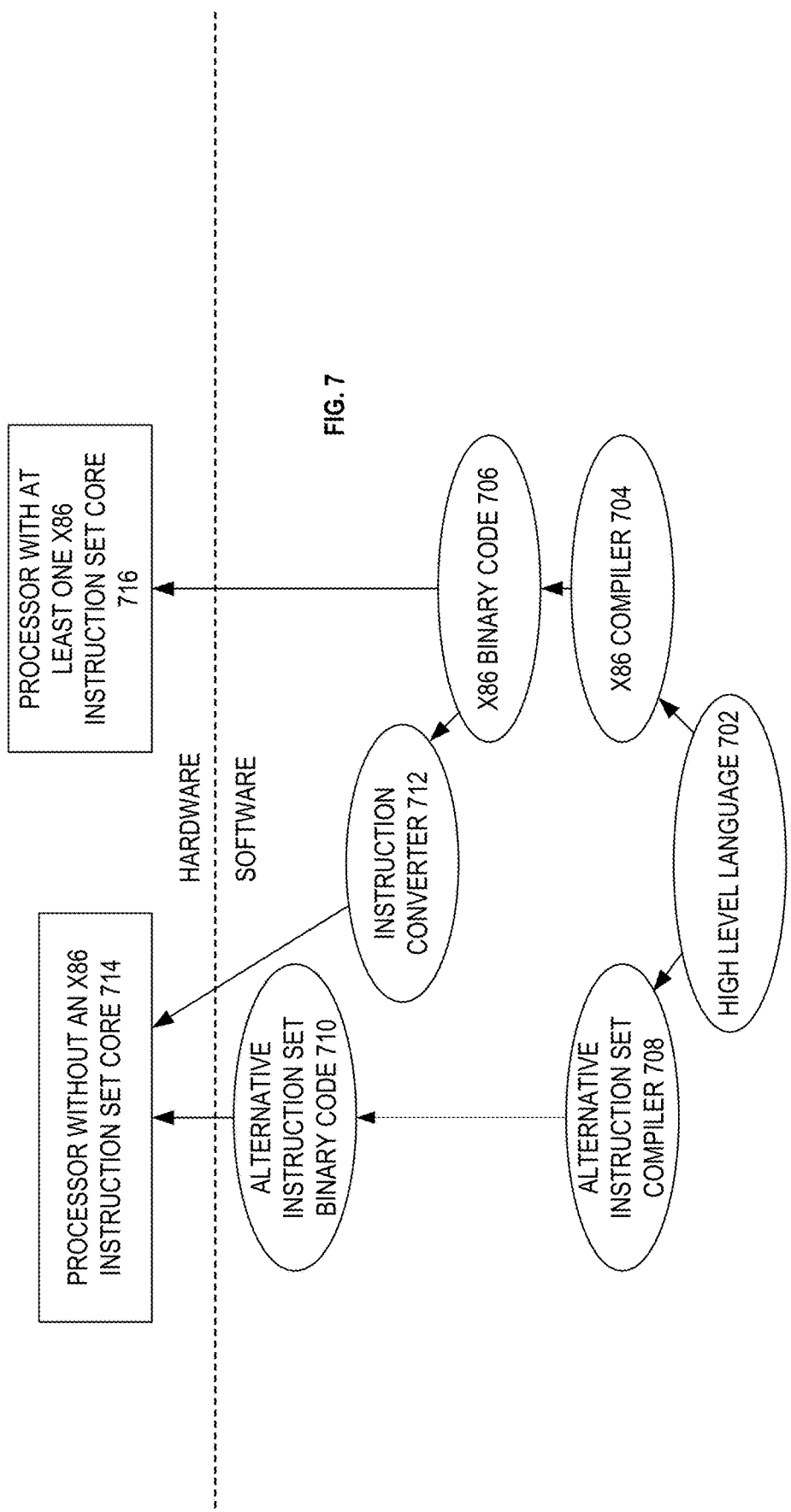
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for a Scalable Free-Running Neuromorphic Processor

One embodiment of the invention is a neuromorphic computer based on a free-running network of small-scale neuromorphic cores, where a neuron can send spike signals to any target neuron in the same core or other cores. The spiking activity of neurons are controlled stochastically by a pseudo-random number generator (PRNG) to enable spike integration by other neurons between the inter-spike intervals. Each neuromorphic core has an associated PRNG to enable spiking activity and time-step updates of neurons in that core. The target neurons integrate the spikes as they arrive through the Network on Chip (NoC) between their inter-spike intervals as determined by the PRNG associated with each core. With this approach, neurons spike in free-running fashion while the incoming spikes are integrated in an event-driven manner.

The embodiments of the invention eliminate the need to implement area and power hungry spike buffers to store all the incoming spikes. A neuromorphic computer comprised of 16K neurons with a fan-in/fan-out of 256 needs around 4 Mbits of spike buffers. The PRNG associated with neuromorphic cores is often compact and the free running network based neuromorphic computer design results in significant area (~10% for fan-in/fan-out of 256) and power savings. The spike controller helps to coordinate time-step updates for the neurons locally within the core and eliminates the need to either route global synchronization signals across the entire chip for time-step control, or guardband using the worst-case number of clock cycles for time-step update operation. Moreover, the proposed solution leverages the stochastic nature of spiking activity and spike integration as motivated by biological principles behind neuromorphic computing.

Neural networks are capable of performing various cognition tasks such as object detection, speech recognition, and financial data prediction. The task of building a neuromorphic computer that is scalable in terms of number of neurons and associated synapses to mimic complex biological neural networks is highly challenging. A "neuron" as used herein comprises dynamically programmable hardware logic and memory which performs calculations and forms fan-in and fan-out connections with other neurons. In one embodiment a "neuron" is implemented as a neuromorphic core. As the synapses (memory) represent the major bottleneck in largescale neuromorphic computer designs in terms of bandwidth, it is highly inefficient to use Von Neumann architectures for massively interconnected neural networks. Existing large-scale neuromorphic computer designs mitigate the bottleneck issue by connecting small-scale neuron cores and co-located synapse memory with a Network on Chip (NoC). Each synapse receives spikes from the NoC, reads its synaptic connection weight, and sends it to a neuron. Each neuron integrates all its weighted fan-in spikes, calculates output spikes, and sends the spikes to other cores through the NoC. By leveraging event-driven communication, the proposed distributed architecture enables highly scalable and power-efficient neuromorphic computer designs.

Figure 8:
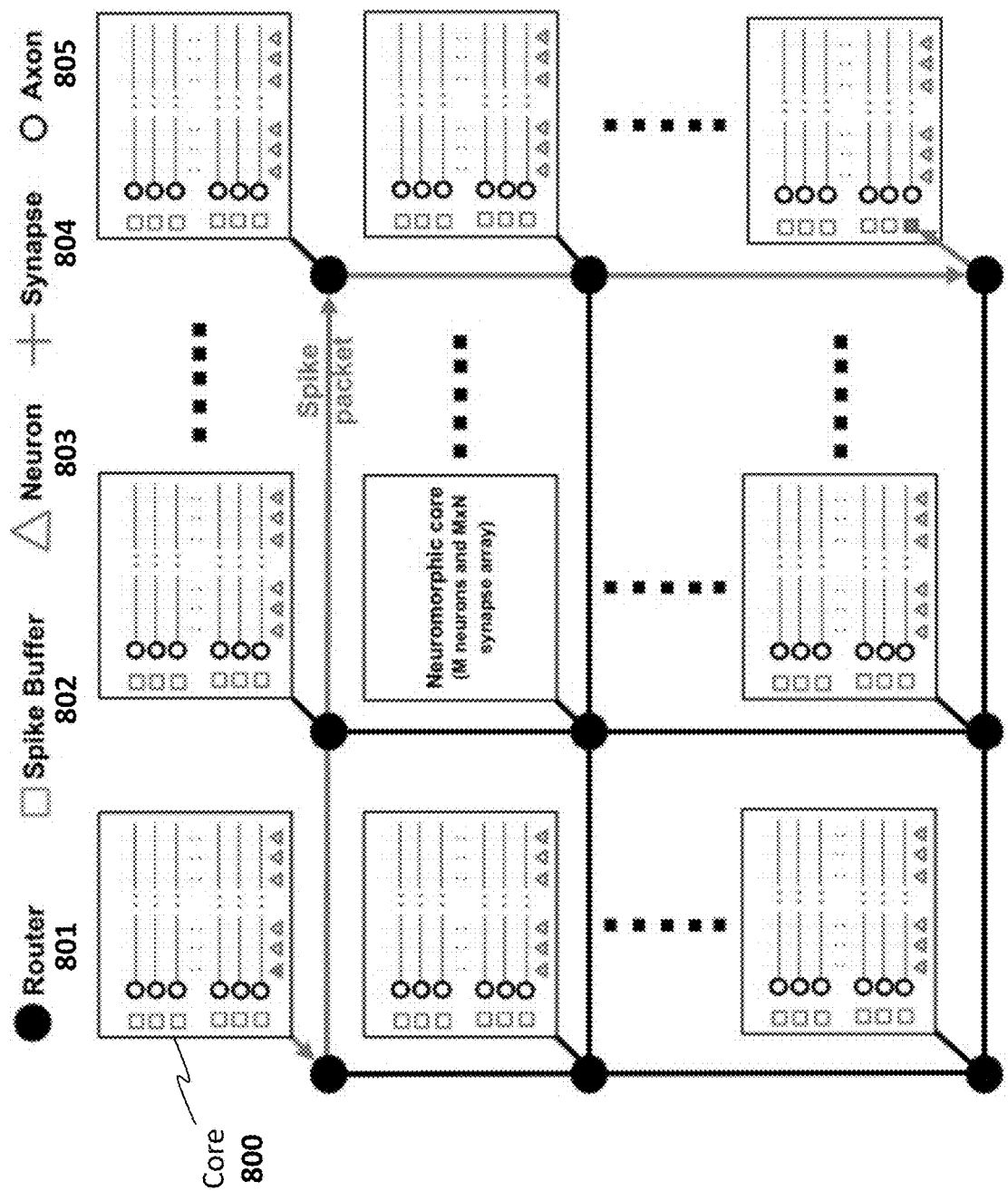
FIG. 8 is a block diagram illustrating an exemplary neuromorphic processor architecture.

As illustrated in FIG. 8, existing neuromorphic computer designs employ spike buffers 802 to store the incoming spikes in a core 800 and a controller triggers the spike integration and spike generation activities for all the neurons 803 in that core. Each spike buffer is coupled to an axon 805. Neuromorphic cores 800 are interconnected via routers 801. Each entry in the spike buffer 802 contains the input spikes to the neuromorphic core for one timestep. Within each timestep, all the input spikes are integrated. Once all the neurons 803 in the entire spiking neural network have completed integration and thresholding, the network proceeds to the next timestep. However, the spike buffers based integration approach adds significant area overhead depending on the number of fan-in/out connections. For full neural network flexibility, at least a 1-bit spike buffer 802 is required for each synapse 804. A neuromorphic computer comprising 16K neurons 804 with a maximum fan-in/out of 256 needs around 4 Million bits of spike buffers to store the incoming spikes, which is around 12% of the total synaptic memory with 8b synapses. Depending on the spiking activity in the network, the incoming spikes are written into spike buffers and the updates result in increased active power consumption. Adding additional memory also results in increased leakage power. Moreover, in the biological neural network, the spikes from pre-synaptic neurons are integrated as they arrive in a post-synaptic neuron unlike in buffer based integration approaches.

Figure 9:
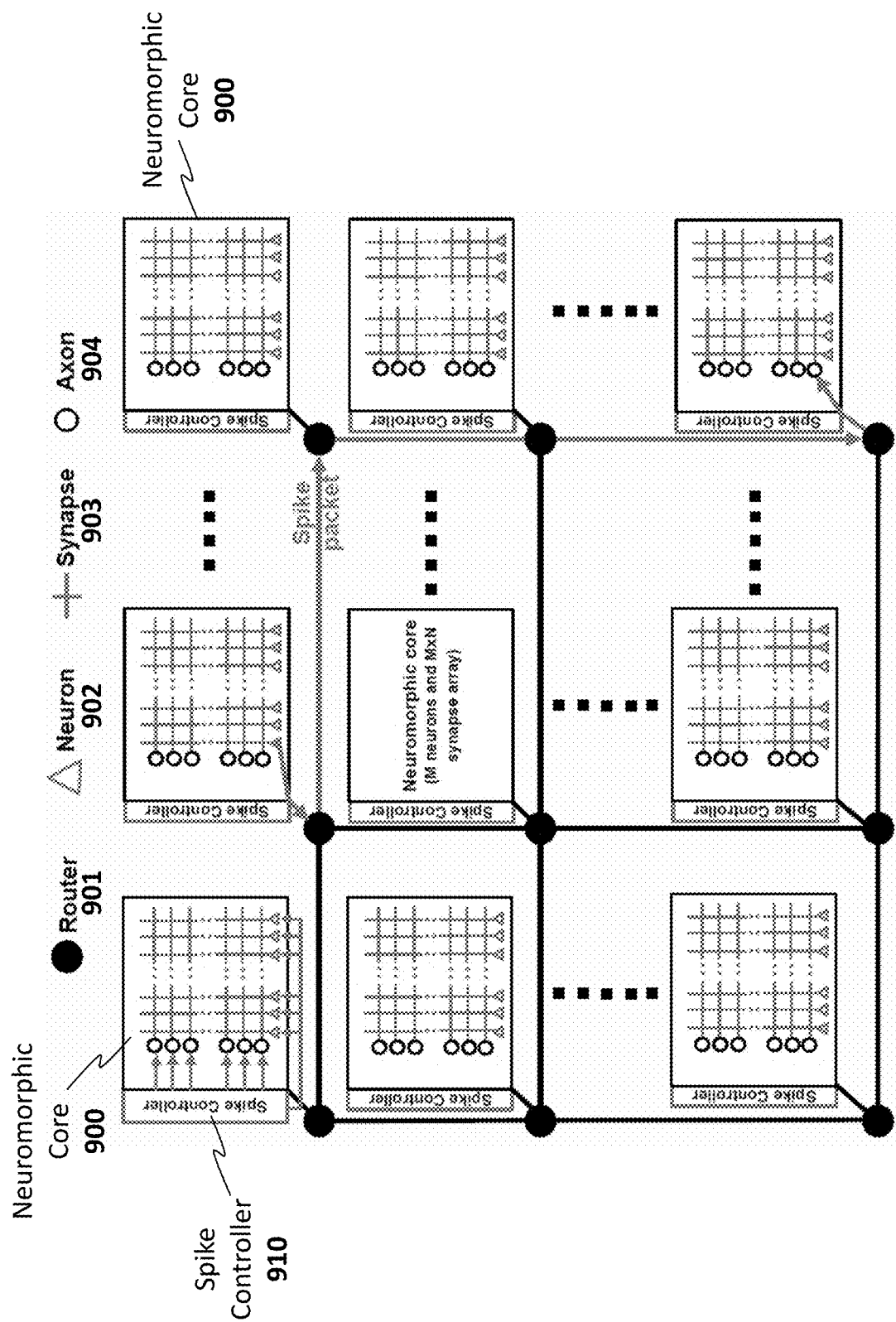
FIG. 9 illustrates one embodiment of a neuromorphic processor which includes spike controllers for generating trigger signals as described herein.

As illustrated in FIG. 9, one embodiment of the invention utilizes a scalable free-running network of neuromorphic cores 900 to build massively interconnected large-scale neuromorphic computers. The spiking activity of neurons 902 in a core are controlled stochastically by a spike controller 910 such that each neuron 902 gets a chance to spike within a time step. Stochasticity in the firing time reduces spike collisions in the neuromorphic computer's NoC.

Figure 10:
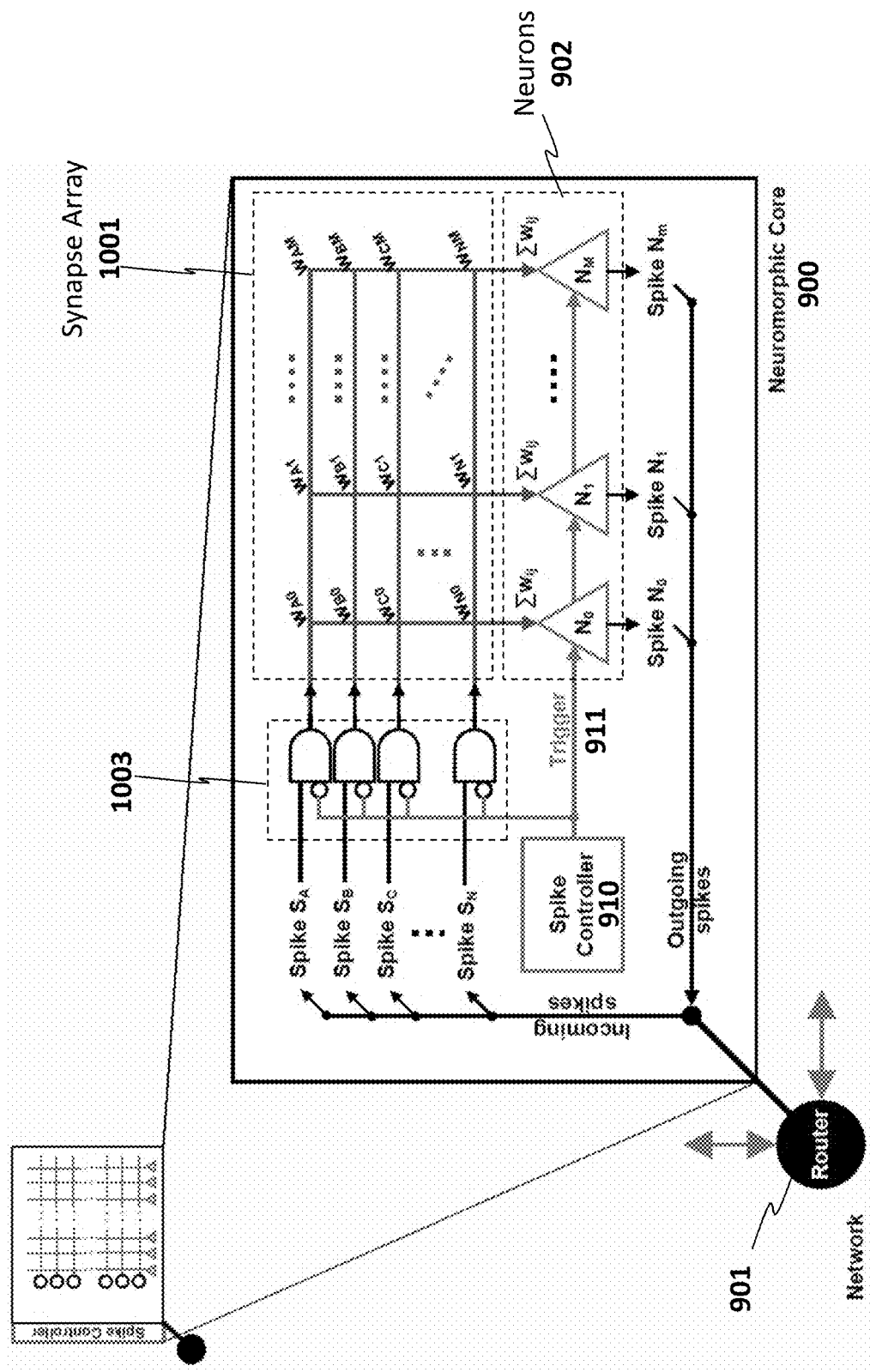
FIG. 10 illustrates one embodiment of a neuromorphic core.

By way of example, and not limitation, FIG. 10 illustrates a neuromorphic core 900 with M neurons 902 and M×N synapse array 1001, where N is the number of fan-in connections for a neuron. In one embodiment, the spike controller 910 generates a trigger signal for a neuron 902 selected randomly within a core (e.g., neuron N1) and the neuron generates a spike upon threshold comparison. The outgoing spikes may be routed back into the neuromorphic core 900 and/or routed to neurons in other neuromorphic cores via router 901. When the trigger signal 911 is at logic low, the neurons 902 in the core keep integrating the incoming spikes as they arrive. Once the neuron N1 generates a spike as determined by the trigger signal and threshold comparison, the spike packet is then sent to the target neuron(s), where the spike is integrated and membrane potential is updated. By adjusting the interval of the trigger signal 911 generated from the spike controllers 910, the free-running network enables the neurons to perform spike integration as the incoming fan-in spikes are received. In one embodiment, the pseudo-random number generator (PRNG) in the spike controller 910 controls the trigger signal 911 generation such that the collisions in the network are minimal (i.e., because of the randomness inserted via the PRNG). Even if there are collisions, the stochastic nature of PRNG ensures that the collisions are not periodic and appear as noise in the network. The NoC can be configured to either drop or block the residual collisions that happen after adjusting the interval of trigger signal 911 generation using the PRNG. The spike integration of all fan-in spikes for a particular neuron is performed within its spiking interval as determined by the trigger signal's frequency. This approach mitigates the need to deploy spike buffers to store incoming fan-in spikes and performs spike integration on-the-fly as they are received.

Figure 11:
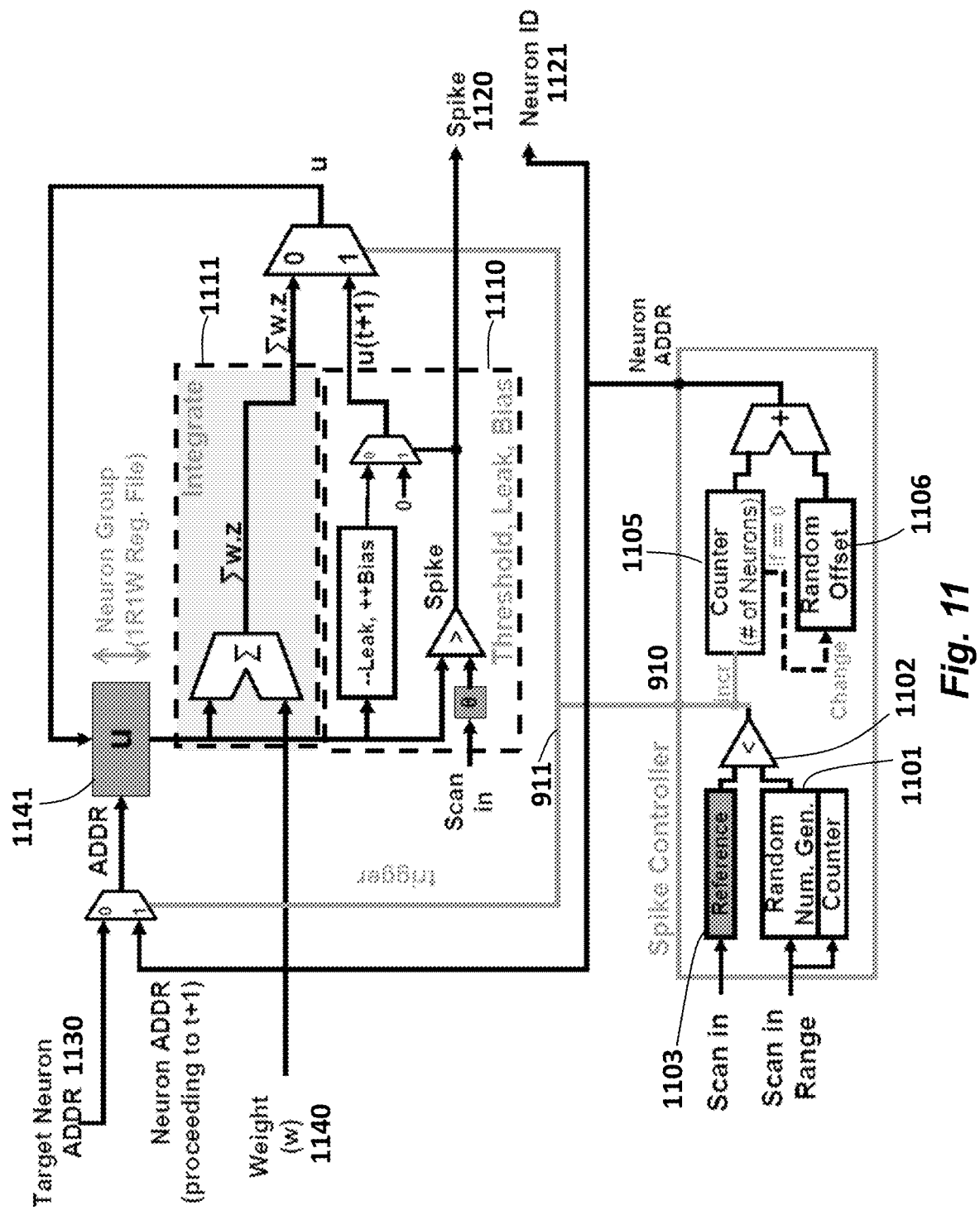
FIG. 11 illustrates one embodiment of a spike controller.

One embodiment of a spike controller and neuron group in a neuromorphic core is illustrated in FIG. 11. The leaky integrate-and-fire neuron model is used in neuromorphic core shown in FIG. 11. One of the key components of the spike controller 910 is a pseudo-random number generator 1101. In the illustrated implementation, a comparator 1102 compares the random number generated by PRNG 1101 with a reference value 1103 and when the random number is lower than the reference value, the trigger signal 911 is asserted high. The periodicity of PRNG is set to a high value when compared to the reference value 1103 to ensure that the interval between subsequent trigger signal assertions is low enough to enable ample duration for spike integration by integration circuitry 1111 by all the neurons.

In one embodiment, when the trigger signal 911 is asserted high, a counter 1105 in the spike controller 910 is incremented, which in turn selects a neuron 902 in the core 900. The counter width (q) may be set according to the number of neurons in the core (e.g., $N=2^q$) and the counter value 1105 is used as the address to select a neuron from the group. To add more stochasticity in neuron spiking activity, a random offset 1106 may be mixed with the counter value 1105 such that the order of spiking activity in a neuromorphic core is random across different time steps.

Once the trigger signal 911 is asserted high, the neuron selected by spike controller 910 undergoes thresholding, spike generation if the membrane potential is larger than the threshold, and timestep update processes, as implemented by threshold/leak/bias circuit 1110. The spike packet 1120 is then transferred to all the fan-out connections along with the spiking neuron's address 1121 (counter value and core ID). If the membrane potential is lower than threshold, the neuron undergoes a leak operation via threshold/leak/bias circuitry 1110. When the trigger signal is at logic low, the neurons in the core integrate all the incoming spikes in the order they arrive as selected by the target address 1130. During the integration process performed by integration circuit 1111, the corresponding weight values 1140 are added with the current membrane potential (u) 1141 and written back into the same register. By adjusting the period of PRNG 1101 in the spike controllers 910 and setting the reference value 1103 low, the spiking activity of neurons across the large-scale neuromorphic computer can be controlled to enable thresholding and timestep update or spike integration with very minimal collisions in the network. As the timestep update happens locally within a core, the embodiments described herein eliminate the need to route global synchronization signals which results in significant routing area and power savings.

Figure 12:
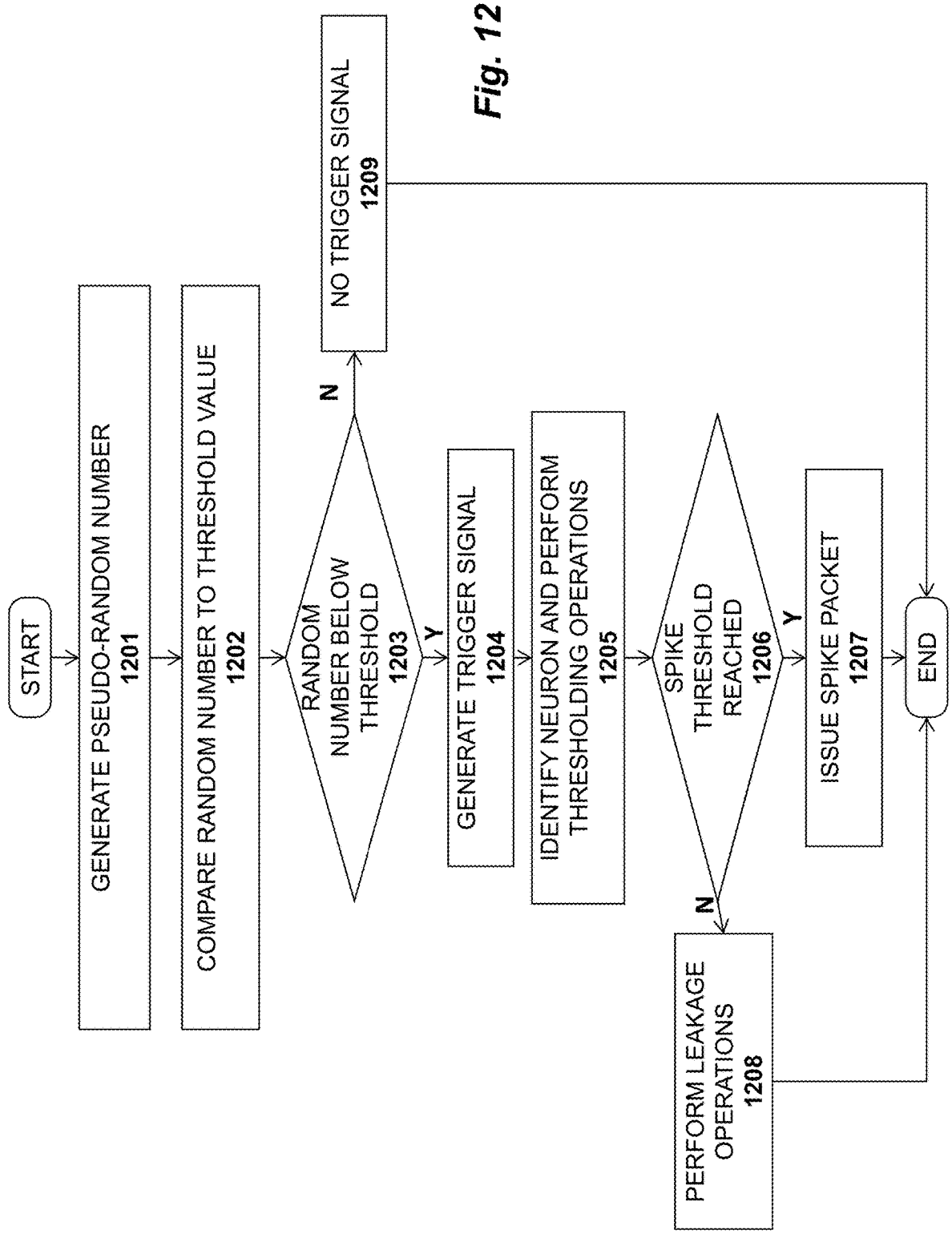
FIG. 12 illustrates one embodiment of a method.

One embodiment of a method is illustrated in FIG. 12. The method may be implemented within the context of the processor architectures described above, but is not limited to any particular architecture.

At 1201 a pseudo-random number is generated and, at 1202, compared to a threshold value. As mentioned, the threshold value may be programmable to adjust the trigger signal. If the random number is below the threshold, determined at 1203, then the trigger signal is generated at 1204. If not, the no trigger signal is generated at 1209 and the process ends.

At 1205, in response to the trigger signal, a neuron is identified (e.g., using the counter value and/or offset as discussed above) which performs thresholding operations. If the spike threshold is reached, determined at 1206, then a spike packet is issued at 1207. If not, then leakage operations are performed at 1208.

The neuromorphic processor architectures described above may be implemented in a computer system that also includes a general purpose processor executing software, such as described above with respect to FIGS. 1A-7. For example, one or more neuromorphic processors may be integrated on a expansion card which interfaces to the general purpose processor via an I/O bus (e.g., a PCIe bus). Alternatively, the neuromorphic embodiments may be implemented in a stand-alone manner. The underlying principles of the invention remain the same regardless of the system-level implementation.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A neuromorphic processing apparatus comprising:
a plurality of neuromorphic cores, each comprising one or more neurons; and
interconnection to communicatively couple at least a subset of the plurality of neuromorphic cores; and
wherein a neuromorphic core within the plurality of neuromorphic cores is to stochastically generate a trigger signal, the trigger signal to cause a selected neuron within the neuromorphic core to perform a thresholding operation to determine whether to issue a spike signal, wherein the selected neuron is selected based on a counter value, and wherein a width of the counter value is determined based on how many neurons are within the neuromorphic core.

2. The neuromorphic processing apparatus as in claim 1 wherein the thresholding operation comprises determining whether a membrane potential is higher than a threshold.

3. The neuromorphic processing apparatus as in claim 2 wherein the spike signal comprises a spike packet transferred to a plurality of fan-out connections with other neurons along with a neuron identifier (ID) of the selected neuron.

4. The neuromorphic processing apparatus as in claim 1 wherein the neuromorphic core comprises a pseudo-random number generator (PRNG) to generate a random number to stochastically generate the trigger signal.

5. The neuromorphic processing apparatus as in claim 4, wherein neuromorphic core is to compare the random number to a reference value, and to generate the trigger signal in response to the random number being lower than the reference value.

6. The neuromorphic processing apparatus as in claim 5 wherein the reference value is programmable to modify a frequency of the trigger signal.

7. The neuromorphic processing apparatus as claim 1 wherein the neuromorphic core is to store the counter value, the counter value being incremented in response to the trigger signal, the counter value usable to generate a neuron identifier (ID) for a neuron to perform the thresholding operation to determine whether to issue a spike signal.

8. The neuromorphic processing apparatus as in claim 7 wherein the neuromorphic core is to combine the counter value with a random offset value to generate the neuron ID.

9. The neuromorphic processing apparatus as in claim 1, wherein the neuromorphic core is to route spike packets between neurons within the neuromorphic core and neurons in different neuromorphic cores.

10. A non-transitory machine-readable medium having program code stored thereon which, when executed by a machine, causes the machine to perform the operations of:
dynamically forming interconnections between a plurality of neuromorphic cores, each comprising one or more neurons; and
stochastically generating a trigger signal for one of the plurality of neuromorphic cores, the trigger signal to cause a selected neuron within the neuromorphic core to perform a thresholding operation to determine whether to issue a spike signal, wherein the selected neuron is selected based on a counter value, and wherein a width of the counter value is determined based on how many neurons are within the neuromorphic core.

11. The non-transitory machine-readable medium as in claim 10 wherein the thresholding operation comprises determining whether a membrane potential is higher than a threshold.

12. The non-transitory machine-readable medium as in claim 11 wherein the spike signal comprises a spike packet transferred to a plurality of fan-out connections with other neurons along with a neuron identifier (ID) of the selected neuron.

13. The non-transitory machine-readable medium as in claim 10 wherein stochastically generating the trigger signal comprises generating a random number usable to stochastically generate the trigger signal.

14. The non-transitory machine-readable medium as in claim 13 further comprising program code to cause the machine to perform the operations of:
comparing the random number to a reference value; and
generating the trigger signal in response to the random number being lower than the reference value.

15. The non-transitory machine-readable medium as in claim 14 wherein the reference value is programmable to modify a frequency of the trigger signal.

16. The non-transitory machine-readable medium as claim 10 further comprising program code to cause the machine to perform the operations of:
incrementing the counter value in response to the trigger signal, the counter value usable to generate a neuron identifier (ID) for a neuron to perform the thresholding operation to determine whether to issue a spike signal.

17. The non-transitory machine-readable medium as in claim 16 further comprising program code to cause the machine to perform the operations of:
combining the counter value with a random offset value to generate the neuron ID.

18. The non-transitory machine-readable medium as in claim 10 further comprising program code to cause the machine to perform the operations of:
routing spike packets between neurons within a neuromorphic core and neurons in different neuromorphic cores.

19. A method comprising:
communicatively coupling a plurality of neuromorphic cores, each comprising one or more neurons; and
stochastically generating a trigger signal for one of the plurality of neuromorphic cores, the trigger signal to cause a selected neuron within the neuromorphic core to perform a thresholding operation to determine whether to issue a spike signal, wherein the selected neuron is selected based on a counter value, and wherein a width of the counter value is determined based on how many neurons are within the neuromorphic core.

20. The method as in claim 19 wherein the thresholding operation comprises determining whether a membrane potential is higher than a threshold.

21. The method as in claim 20 wherein the spike signal comprises a spike packet transferred to a plurality of fan-out connections with other neurons along with a neuron identifier (ID) of the selected neuron.

22. The method as in claim 19 wherein stochastically generating the trigger signal comprises generating a random number usable to stochastically generate the trigger signal.

23. The method as in claim 22 further comprising:
comparing the random number to a reference value; and
generating the trigger signal in response to the random number being lower than the reference value.

24. The method as in claim 23 wherein the reference value is programmable to modify a frequency of the trigger signal.

25. The method as claim 19 further comprising:
incrementing the counter value in response to the trigger signal, the counter value usable to generate a neuron identifier (ID) for a neuron to perform the thresholding operation to determine whether to issue a spike signal.

26. The method as in claim 25 further comprising:
combining the counter value with a random offset value to generate the neuron ID.

27. The method as in claim 19 further comprising:
routing spike packets between neurons within a neuromorphic core and neurons in different neuromorphic cores.

* * * * *